(12) United States Patent
Roelofs et al.

(10) Patent No.: US 8,664,282 B2
(45) Date of Patent: Mar. 4, 2014

(54) PROCESS TO PREPARE CROSSLINKABLE TRIFLUOROSTYRENE POLYMERS AND MEMBRANES

(75) Inventors: Mark Gerrit Roelofs, Hockessin, DE (US); Mark F. Teasley, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 459 days.

(21) Appl. No.: 12/809,364

(22) PCT Filed: Dec. 18, 2008

(86) PCT No.: PCT/US2008/087347
§ 371 (c)(1),
(2), (4) Date: Jun. 18, 2010

(87) PCT Pub. No.: WO2009/082663
PCT Pub. Date: Jul. 2, 2009

(65) Prior Publication Data
US 2010/0292351 A1    Nov. 18, 2010

Related U.S. Application Data

(60) Provisional application No. 61/015,252, filed on Dec. 20, 2007.

(51) Int. Cl.
*C08J 5/00* (2006.01)

(52) U.S. Cl.
USPC ....... 521/27; 521/32; 521/33; 522/1; 522/156

(58) Field of Classification Search
USPC .............................. 521/27, 32, 33; 522/156, 1
See application file for complete search history.

(56) References Cited

U.S. PATENT DOCUMENTS

| 3,664,915 | A | 5/1972 | Gore | |
|---|---|---|---|---|
| 3,953,566 | A | 4/1976 | Gore | |
| 3,962,153 | A | 6/1976 | Gore | |
| 4,187,390 | A | 2/1980 | Gore | |
| 5,547,551 | A | 8/1996 | Bahar et al. | |
| 6,110,333 | A | 8/2000 | Spethmann et al. | |
| 6,639,011 | B2 * | 10/2003 | Arcella et al. | ................ 524/835 |
| 2005/0131097 | A1 * | 6/2005 | Jing et al. | ..................... 522/1 |

FOREIGN PATENT DOCUMENTS

| EP | 1172382 A2 * | 1/2002 |
|---|---|---|
| EP | 1323751 A2 * | 7/2003 |
| WO | 2005/003083 A1 | 1/2005 |
| WO | WO-2005/003083 A1 * | 1/2005 |
| WO | 2005/113491 A1 | 12/2005 |
| WO | WO-2005/113491 A1 * | 12/2005 |
| WO | 2006/102670 A1 | 9/2006 |
| WO | WO-2006/102670 A1 * | 9/2006 |

OTHER PUBLICATIONS

PCT International Sear Report and Written Opinion dated Mar. 11, 2009.
Heinze et al., Palladium-Catalyzed Cross-Coupling of Perfluoroalkenylzinc Reagents with Aryl Iodides, Journal of Organic Chemistry, 1988, vol. 53, pp. 2714-2720.
Feiring et al., Aromatic monomers with pendant fluoroalkylsulfonate and sulfonimide groups, Journal of Fluorine Chemistry, 2000, vol. 105, pp. 129-135.
PCT International Search Report and Written Opinion dated Jun. 5, 2009 for co-pending U.S. Appl. No. 12/809,286.

* cited by examiner

*Primary Examiner* — Peter D. Mulcahy
*Assistant Examiner* — Henry Hu
(74) *Attorney, Agent, or Firm* — Andrew G. Bunn

(57) ABSTRACT

Described herein is a process to prepare crosslinkable polymers based on trifluorostyrene, and their use as polymer electrolyte membranes.

6 Claims, No Drawings

PROCESS TO PREPARE CROSSLINKABLE TRIFLUOROSTYRENE POLYMERS AND MEMBRANES

FIELD OF INVENTION

Described herein is a process to prepare crosslinkable polymers based on trifluorostyrene, and their use as polymer electrolyte membranes.

BACKGROUND

Polymer electrolyte membrane fuel cells (PEMFC) are expected to provide higher efficiencies, fewer environmental pollutants, and reduced operating and maintenance costs than traditional power sources. An important component of a PEMFC is a polymer electrolyte membrane (PEM). The range of potential candidates for use as membrane materials in PEMFCs is limited by a number of requirements, including chemical, thermal, and mechanical stability, high ionic conductivity, and low reactant permeability. Developments have been made in the use of sulfonic acid functionalized polymers, including membranes such as Nafion® perfluorosulfonic acid membranes.

By lowering the equivalent weight of sulfonic acid functionalized polymers, the conductivity of such polymers can be improved, which is needed for improved fuel cell performance. Current proton-exchange membranes, such as Nafion® perfluorosulfonic acid membranes, are limited in how much their equivalent weight can be lowered before they lose their membrane forming properties, or before they exhibit excessive water swell. Low equivalent weight ionomers do not possess the crystallinity needed to impart integrity to their membranes and resist swelling or even solubility in water.

There is an ongoing need for conductive membranes suitable for use in applications such as fuel cells that exhibit good ionic conductivity while maintaining good crystallinity and hydration, as well as chemical, thermal, and mechanical stability at high temperatures.

SUMMARY

Disclosed is a process to prepare a crosslinked membrane, comprising the steps:

a. providing a copolymer comprising repeat units of Formulae (V), (VI) and (VII)

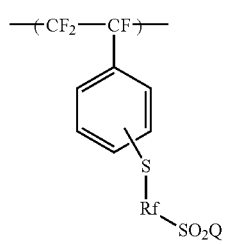

V

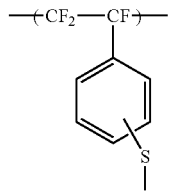

VI

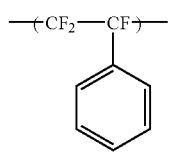

VII wherein Rf and Rf' are independently a linear or branched perfluoroalkylene group, optionally containing oxygen or chlorine; X is Br or Cl; and Q is F, Br, or Cl;

b. hydrolyzing the —$SO_2Q$ moiety to form a —$SO_3H$ moiety or salt thereof to form a hydrolyzed copolymer;

c. optionally, contacting the hydrolyzed copolymer with an oxidizing agent to convert the —S— moiety into a —$SO_2$— moiety to form an oxidized copolymer;

d. forming a membrane from the hydrolyzed copolymer of step (b) or the oxidized copolymer of step (c); and e. exposing the membrane to radiation to form a crosslinked membrane.

Also disclosed is a process to prepare a crosslinked membrane, comprising the steps:

a. providing a copolymer comprising repeat units of Formulae (V) and (VI)

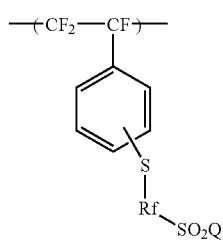

V

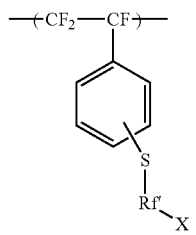

VI wherein Rf and Rf' are independently a linear or branched perfluoroalkylene group, optionally containing oxygen or chlorine; X is Br or Cl; and Q is F, Br, or Cl;

b. forming a membrane from the copolymer;

c. exposing the membrane to radiation to form a crosslinked membrane;

d. optionally, contacting the crosslinked membrane with an oxidizing agent to convert the —S— moiety into a —$SO_2$— moiety; and e. hydrolyzing the —SO$_2$Q moiety to form a —SO$_3$H moiety or salt thereof.

Also disclosed is a process to prepare a crosslinked membrane, comprising the steps:

a. providing a copolymer comprising repeat units of Formulae (V) and (VI)

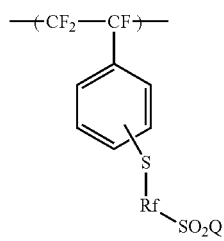

V

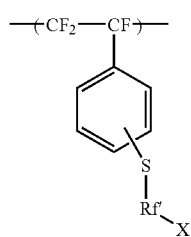

VI wherein Rf and Rf' are independently a linear or branched perfluoroalkylene group, optionally containing oxygen or chlorine; X is Br or Cl; and Q is F, Br, or Cl;

b. hydrolyzing the —SO$_2$Q moiety to form a —SO$_3$H moiety or salt thereof to form a hydrolyzed copolymer;
c. forming a membrane from the hydrolyzed copolymer;
d. exposing the membrane to radiation to form a crosslinked membrane; and
e. optionally, contacting the crosslinked membrane with an oxidizing agent to convert the —S— moiety into a —SO$_2$— moiety.

Also disclosed is a process to prepare a crosslinked membrane, comprising the steps:

a. providing a copolymer comprising repeat units of Formulae (V) and (VI)

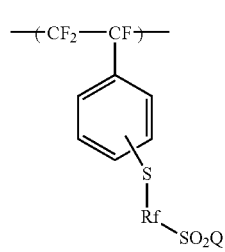

V

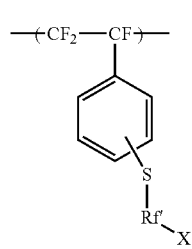

VI wherein Rf and Rf' are independently a linear or branched perfluoroalkylene group, optionally containing oxygen or chlorine; X is Br or Cl; and Q is F, Br, or Cl;

b. forming a membrane from the copolymer;
c. hydrolyzing the —SO$_2$Q moiety to form a —SO$_3$H moiety or salt thereof;
d. exposing the hydrolyzed membrane to radiation to form a crosslinked membrane; and
e. optionally, contacting the crosslinked membrane with an oxidizing agent to convert the —S— moiety into a —SO$_2$— moiety.

DETAILED DESCRIPTION

Disclosed herein are polymers that are useful as cation-exchange resins. The cation-exchange resins are useful in making proton-exchange membranes for electrochemical cells such as fuel cells and can be used in any application wherein cation-exchange capacity is desired. The resins may also be used as electrolytes, electrode binders, in lithium batteries in lithium salt form, and in any application requiring charge-transfer phenomena, such as components of light-emitting displays.

Described herein is a copolymer comprising repeat units of Formula (I) and Formula (II)

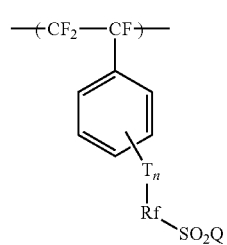

I

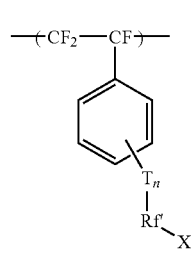

II wherein Rf and Rf' are independently a linear or branched perfluoroalkylene group, optionally containing oxygen or chlorine; T is independently S, SO, or SO$_2$; n is 0 or 1; X is Br or Cl; and Q is F, Br, Cl, or OM wherein M is a univalent cation.

The pendant groups are independently at any open valence of the rings as indicated. In one embodiment Formulae (I) and (II) are of the Formulae (Ia) and (IIa)

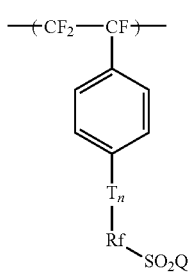

Ia

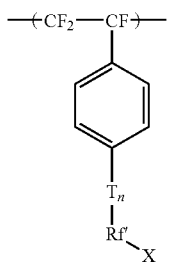

IIa

By "perfluorinated alkylene" it is meant a divalent group containing carbon and fluorine connected by single bonds, optionally substituted with ether oxygens or other halogens, and containing two free valences to different carbon atoms. Typically Rf and Rf' are independently selected from the group consisting of $(CF_2)_r$ wherein r=1 to 20, $(CF_2CF_2)_rOCF_2CF_2$ wherein r=0 to 6, and $(CF_2CF(CF_3)O)_rCF_2CF_2$ wherein r=1 to 8; more typically Rf and Rf' are independently selected from the group consisting of $(CF_2)_r$ wherein r=1 to 4. Typically Q is F, X is Br, M is H, n is 1 and T is S or $SO_2$.

The term "copolymer" is intended to include oligomers and polymers having two or more different repeating units. A copolymer having repeating units derived from a first unsaturated monomer "A" and a second unsaturated monomer "B" will have repeating units (-A-) and (-B-). The copolymers described herein can be random or block copolymers.

The practical upper limit to the number of monomeric units in the polymer is determined in part by the desired solubility of a polymer in a particular solvent or class of solvents. As the total number of monomeric units increases, the molecular weight of the polymer increases. The increase in molecular weight is generally expected to result in a reduced solubility of the polymer in a particular solvent. Moreover, in one embodiment, the number of monomeric units at which a polymer becomes substantially insoluble in a given solvent is dependent in part upon the structure of the monomer. In one embodiment, the number of monomeric units at which a copolymer becomes substantially insoluble in a given solvent is dependent in part upon the ratio of the comonomers. For example, a polymer composed of flexible monomers may become substantially insoluble in an organic solvent if the resulting polymer becomes too rigid in the course of polymerization. As another example, a copolymer composed of several monomers may become substantially insoluble in an organic solvent when the ratio of rigid monomeric units to flexible monomeric units is too large. The selection of polymer molecular weight, polymer and copolymer composition, and a solvent is within the purview of one skilled in the art.

The copolymer can additionally contain other repeat units in order to modify the electronic, mechanical or chemical properties of the polymer. One suitable repeating unit that can be incorporated is of Formula (VII)

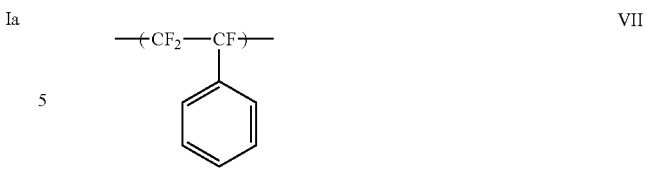

VII

Suitable monomers that can be used to form the polymers described herein are unsaturated analogs of the repeating units, such as Formula (III) and (IV):

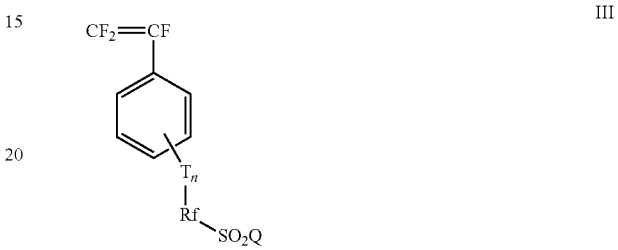

III

IV

Other suitable monomers that can be incorporated would have similar unsaturation.

Techniques that can be followed to prepare the monomers can be found in WO2005/03083 and WO2005/113491. Another method is the Pd catalyzed reaction of a trifluorovinyl zinc reagent with an aryl bromide (Feiring et al, J. Fluorine Chem. 2000, 105, 129). The trifluorovinyl zinc reagent can be made from the reaction of $CF_2$=CFBr and zinc powder in N,N-dimethylformamide (Burton et al, J. Org. Chem. 1988, 53, 2714).

Monomers where n is 0 can be prepared by reaction of iodohalobenzenes with I—$R_F SO_2 F$ in the presence of copper powder to give the coupling products $XC_6H_4R_FSO_2F$, wherein X=I, Br, followed by a palladium catalyzed coupling reaction with $CF_2$=CFZnX. Another method includes first adding $CF_2ClCFICl$ to iodo- or bromobenzenes to give $CF_2ClCFClC_6H_4X$ wherein X=I, Br, and then coupling with I—$R_FSO_2F$ in the presence of copper powder to produce the coupled product, $CF_2ClCFClC_6H_4R_FSO_2F$, which was treated with Zn to produce the desired monomer $CF_2$=$CFC_6H_4R_FSO_2F$. $CF_2ClCFICl$ also reacts with diiodoor dibromobenzenes to give $CF_2ClCFClC_6H_3X_2$ wherein X=Br, I, which may be coupled with I—$R_FSO_2F$ and copper powder resulting in $CF_2ClCFClC_6H_3(R_FSO_2F)_2$. Finally, dechlorination of $CF_2ClCFClC_6H_3(R_FSO_2F)_2$ with zinc gives $CF_2=CFC_6H_3(R_FSO_2F)_2$.

These monomers are used to prepare the copolymers using standard polymerization techniques. The monomers can be used in any ratio, but typically the mole fractions for the repeat units of the resulting copolymers are 0.99 to 0.80 for Formula (I), 0.01 to 0.10 for Formula (II), and 0 to 0.10 for optional Formula (VII). Polymerization may be conducted by neat polymerization, solution polymerization, suspension polymerization, or emulsion polymerization. Typical initiators such as Lupersol® 11 and perfluoroacyl peroxide can be used in suspension polymerization or solution polymerization. In an aqueous emulsion polymerization, inorganic peroxides such as potassium persulfates (KPS) and ammonium persulfate (APS) obtained from Aldrich, Milwaukee, Wis. can be used as the initiator, and fluorinated organic salts such as ammonium perfluorooctanoate and fluorinated alkane sulfonates, or non-fluorinated surfactants such as dodecylamine hydrochloride salt can be used as surfactants. The molecular weight of the polymers can be controlled by addition of chain transfer agents such as halocarbons, chloroform, fluorinated iodides and bromides, methanol, ethers, esters and alkanes.

The polymers can be isolated by any suitable means, such as freezing of an aqueous emulsion and treatment with nitric acid to agglomerate the polymer or precipitation from solution using a non-solvent followed by filtration. The polymers also can be dissolved in suitable solvents such as tetrahydrofuran, trifluorotoluene and 2,5-dichlorotrifluorotoluene for further processing.

Membranes can be formed from the polymers by any suitable method. The polymers can also be crosslinked, either before or after formation into membranes. If the pendant group of the repeating units contains a —S— moiety, it can be oxidized into a —SO$_2$— moiety using oxidizing agents such as chromium(VI) oxide, catalytic chromium(VI) oxide with periodic acid, hydrogen peroxide, or hypofluorous acid. These oxidations can be performed either before or after formation into membranes. Typically the copolymers are either oxidized in solution using catalytic chromium(VI) oxide with periodic acid before formation of membranes, or can be oxidized with hypofluorous acid after formation of the membranes. A variety of different polymers with various properties can be made by altering the order in which these procedures are performed.

One process to prepare a crosslinked membrane comprises the following steps:
a. providing a copolymer comprising repeat units of Formulae (V), (VI) and (VII)

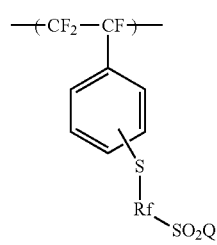

V

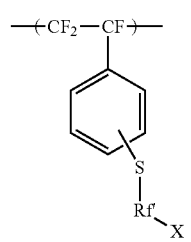

VI

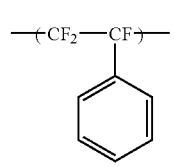

VII wherein Rf and Rf' are independently a linear or branched perfluoroalkylene group, optionally containing oxygen or chlorine; X is Br or Cl; and Q is F, Br, or Cl;
b. hydrolyzing the —SO$_2$Q moiety to form a —SO$_3$H moiety or salt thereof to form a hydrolyzed copolymer;
c. optionally, contacting the hydrolyzed copolymer with an oxidizing agent to convert the —S— moiety into a —SO$_2$— moiety to form an oxidized copolymer;
d. forming a membrane from the hydrolyzed copolymer of step (b) or the oxidized copolymer of step (c); and
e. exposing the membrane to radiation to form a crosslinked membrane.

Another process to prepare a crosslinked membrane comprises the following steps:
a. providing a copolymer comprising repeat units of Formulae (V) and (VI)

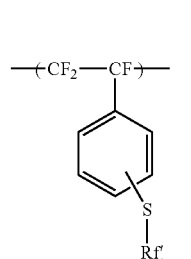

V

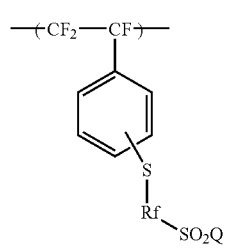

VI wherein Rf and Rf' are independently a linear or branched perfluoroalkylene group, optionally containing oxygen or chlorine; X is Br or Cl; and Q is F, Br, or Cl;
b. forming a membrane from the copolymer;
c. exposing the membrane to radiation to form a crosslinked membrane;
d. optionally, contacting the crosslinked membrane with an oxidizing agent to convert the —S— moiety into a —SO$_2$— moiety; and e. hydrolyzing the —SO$_2$Q moiety to form a —SO$_3$H moiety or salt thereof.

This process can additionally comprise repeat units of the Formula (VII).

Another process to prepare a crosslinked membrane comprises the following steps:

a. providing a copolymer comprising repeat units of Formulae (V) and (VI)

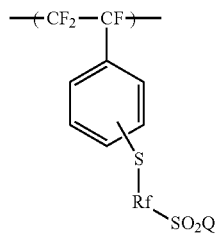

V

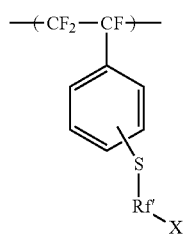

VI wherein Rf and Rf' are independently a linear or branched perfluoroalkylene group, optionally containing oxygen or chlorine; X is Br or Cl; and Q is F, Br, or Cl;

b. hydrolyzing the —SO$_2$Q moiety to form a —SO$_3$H moiety or salt thereof to form a hydrolyzed copolymer;

c. forming a membrane from the hydrolyzed copolymer;

d. exposing the membrane to radiation to form a crosslinked membrane; and e. optionally, contacting the crosslinked membrane with an oxidizing agent to convert the —S— moiety into a —SO$_2$— moiety.

This process can additionally comprise repeat units of the Formula (VII).

Also disclosed is a process to prepare a crosslinked membrane, comprising the steps:

a. providing a copolymer comprising repeat units of Formulae (V) and (VI)

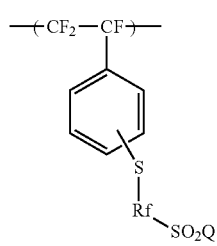

V

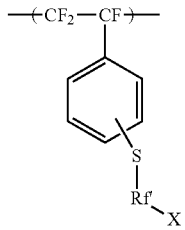

VI wherein Rf and Rf' are independently a linear or branched perfluoroalkylene group, optionally containing oxygen or chlorine; X is Br or Cl; and Q is F, Br, or Cl;

b. forming a membrane from the copolymer;

c. hydrolyzing the —SO$_2$Q moiety to form a —SO$_3$H moiety or salt thereof;

d. exposing the hydrolyzed membrane to radiation to form a crosslinked membrane; and e. optionally, contacting the crosslinked membrane with an oxidizing agent to convert the —S— moiety into a —SO$_2$— moiety.

This process can additionally comprise repeat units of the Formula (VII).

By "perfluorinated alkylene" it is meant a divalent group containing carbon and fluorine connected by single bonds, optionally substituted with ether oxygens or other halogens, and containing two free valences to different carbon atoms. Typically Rf and Rf' are independently selected from the group consisting of $(CF_2)_r$, wherein r=1 to 20, $(CF_2CF_2)_rOCF_2CF_2$ wherein r=0 to 6, and $(CF_2CF(CF_3)O)_rCF_2CF_2$ wherein r=1 to 8; more typically Rf and Rf' are independently selected from the group consisting of $(CF_2)_r$ wherein r=1 to 4. Typically Q is F, X is Br, M is H, n is 1 and T is S or SO$_2$.

The polymers prepared by the disclosed methods can be recovered according to conventional techniques including filtration and precipitation using a non-solvent. They also can be dissolved or dispersed in a suitable solvent for further processing.

Typically the crosslinking step is performed after the polymer is formed into a membrane, including where the membrane comprises a reinforcement or porous support as described further hereinbelow. The crosslinking can be performed by any means known in the art. One suitable method comprises exposing the polymer to radiation, such as but not limited to ultraviolet radiation, gamma ray radiation, electron beam radiation and heavy ion radiation resulting in the formation of crosslinks. Any suitable apparatus can be used. Typically electron beam radiation is used at a dosage of 10-100 kGy.

Although not wishing to be bound by theory, it is believed that the crosslinks form via reaction of the pendant —Rf'—X groups with the aromatic ring of any repeat unit to form —Rf'— crosslinks.

The polymers described herein can be formed into membranes using any conventional method such as but not limited to solution or dispersion film casting or extrusion techniques. The membrane thickness can be varied as desired for a particular application. Typically, for electrochemical uses, the membrane thickness is less than about 350 μm, more typically in the range of about 25 μm to about 175 μm. If desired, the membrane can be a laminate of two polymers such as two polymers having different equivalent weight. Such films can be made by laminating two membranes. Alternatively, one or both of the laminate components can be cast from solution or dispersion. When the membrane is a laminate, the chemical identities of the monomer units in the additional polymer can independently be the same as or different from the identities of the analogous monomer units of the first polymer. One of ordinary skill in the art will understand that membranes prepared from the dispersions may have utility in packaging, in non-electrochemical membrane applications, as an adhesive or other functional layer in a multi-layer film or sheet structure, and other classic applications for polymer films and sheets that are outside the field of electrochemistry. For the purposes of the present invention, the term "membrane", a term of art in common use in electrochemistry, is synonymous with the terms "film" or "sheet", which are terms of art in more general usage, but refer to the same articles.

The membrane may optionally include a porous support or reinforcement for the purposes of improving mechanical properties, for decreasing cost and/or other reasons. The porous support may be made from a wide range of materials, such as but not limited to non-woven or woven fabrics, using various weaves such as the plain weave, basket weave, leno weave, or others. The porous support may be made from glass, hydrocarbon polymers such as polyolefins, (e.g., polyethylene, polypropylene, polybutylene, and copolymers), and perhalogenated polymers such as polychlorotrifluoroethylene. Porous inorganic or ceramic materials may also be used. For resistance to thermal and chemical degradation, the support typically is made from a fluoropolymer, more typically a perfluoropolymer. For example, the perfluoropolymer of the porous support can be a microporous film of polytetrafluoroethylene (PTFE) or a copolymer of tetrafluoroethylene. Microporous PTFE films and sheeting are known that are suitable for use as a support layer. For example, U.S. Pat. No. 3,664,915 discloses uniaxially stretched film having at least 40% voids. U.S. Pat. Nos. 3,953,566, 3,962,153 and 4,187,390 disclose porous PTFE films having at least 70% voids. Impregnation of expanded PTFE (ePTFE) with perfluorinated sulfonic acid polymer is disclosed in U.S. Pat. Nos. 5,547,551 and 6,110,333. ePTFE is available under the trade name "Goretex" from W. L. Gore and Associates, Inc., Elkton, Md., and under the trade name "Tetratex" from Donaldson Company, Inc., Bloomington, Minn.

Membrane electrode assemblies (MEA) and fuel cells therefrom are well known in the art and can comprise any of the membranes described above. One suitable embodiment is described herein. An ionomeric polymer membrane is used to form a MEA by combining it with a catalyst layer, comprising a catalyst such as platinum, which is unsupported or supported on carbon particles, a binder such as Nafion®, and a gas diffusion backing. The catalyst layers may be made from well-known electrically conductive, catalytically active particles or materials and may be made by methods well known in the art. The catalyst layer may be formed as a film of a polymer that serves as a binder for the catalyst particles. The binder polymer can be a hydrophobic polymer, a hydrophilic polymer, or a mixture of such polymers. The binder polymer is typically ionomeric and can be the same ionomer as in the membrane. A fuel cell is constructed from a single MEA or multiple MEAs stacked in series by further providing porous and electrically conductive anode and cathode gas diffusion backings, gaskets for sealing the edge of the MEA(s), which also provide an electrically insulating layer, graphite current collector blocks with flow fields for gas distribution, aluminum end blocks with tie rods to hold the fuel cell together, an anode inlet and outlet for fuel such as hydrogen, and a cathode gas inlet and outlet for oxidant such as air.

EXAMPLES 2-(4-Bromophenylthio)tetrafluoroethyl bromide and 2-[(4-trifluorovinyl)phenylthio]tetrafluoroethanesulfonyl fluoride were prepared according to the procedure described in WO 2005/113491, page 14. 2-(4-Bromophenylthio)tetrafluoroethyl bromide was vacuum distilled at 42-48° C./37-38 mTorr taking the center cut of clear distillate. The trifluorovinyl zinc reagent was prepared from bromotrifluoroethylene in N,N-dimethylformamide (DMF) according to P. L. Heinze and D. J. Burton *J. Org. Chem* 1988, 53, 2714.

Through-Plane Conductivity Measurement

The through-plane conductivity of a membrane was measured by a technique in which the current flowed perpendicular to the plane of the membrane. The lower electrode was formed from a 12.7 mm diameter stainless steel rod and the upper electrode was formed from a 6.35 mm diameter stainless steel rod. The rods were cut to length, machined with grooves to accept "O"-ring seals, and their ends were polished and plated with gold. The lower electrode had six grooves (0.68 mm wide and 0.68 mm deep) to allow humidified air flow. A stack was formed consisting of lower electrode/GDE/membrane/GDE/upper electrode. The GDE (gas diffusion electrode) was a catalyzed ELAT® (E-TEK Division, De Nora North America, Inc., Somerset, N.J.) comprising a carbon cloth with microporous layer, platinum catalyst, and 0.6-0.8 mg/cm$^2$ Nafion® application over the catalyst layer. The lower GDE was punched out as a 9.5 mm diameter disk, while the membrane and the upper GDE were punched out as 6.35 mm diameter disks to match the upper electrode. The stack was assembled and held in place within a 46.0×21.0 mm×15.5 mm block of annealed glass-fiber reinforced machinable PEEK that had a 12.7 mm diameter hole drilled into the bottom of the block to accept the lower electrode and a concentric 6.4 mm diameter hole drilled into the top of the block to accept the upper electrode. The PEEK block also had straight threaded connections. Male connectors with SAE straight thread and tubing to "O"-ring seals (1M1SC2 and 2 M1SC2 from Parker Instruments) were used to connect to the variable humidified air feed and discharge. The fixture was placed into a small vice with rubber grips and 10 lb-in of torque was applied using a torque wrench. The fixture containing the membrane was connected to 1/16" tubing (humidified air feed) and 1/8" tubing (humidified air discharge) inside a thermostated forced-convection oven for heating. The temperature within the vessel was measured by means of a thermocouple.

Water was fed from an Isco Model 500D syringe pump with pump controller. Dry air was fed (200 sccm standard) from a calibrated mass flow controller (Porter F201 with a Tylan® RO-28 controller box). To ensure water evaporation, the air and the water feeds were mixed and circulated through a 1.6 mm (1/16"), 1.25 m long piece of stainless steel tubing inside the oven. The resulting humidified air was fed into the 1/16" tubing inlet. The cell pressure (atmospheric) was measured with a Druck® PDCR 4010 Pressure Transducer with a DPI 280 Digital Pressure Indicator. The relative humidity was calculated assuming ideal gas behavior using tables of the vapor pressure of liquid water as a function of temperature, the gas composition from the two flow rates, the vessel temperature, and the cell pressure. The grooves in the lower electrode allowed flow of humidified air to the membrane for rapid equilibration with water vapor. The real part of the AC impedance of the fixture containing the membrane, $R_s$, was measured at a frequency of 100 kHz using a Solartron SI 1260 Impedance/Gain Phase Analyzer and SI 1287 Electrochemical Interphase with ZView 2 and ZPlot 2 software (Solartron Analytical, Farnborough, Hampshire, GU14 0NR, UK). The fixture short, $R_{fs}$ was also determined by measuring the real part of the AC impedance at 100 kHz for the fixture and stack assembled without a membrane sample. The conductivity, κ, of the membrane was then calculated as $$\kappa = t/((R_s - R_f) * 0.317 \text{ cm}^2),$$

where t was the thickness of the membrane in cm.

Example 1

Inside a glove box, a three-neck 250 mL round-bottom flask equipped with a reflux condenser, stirring bar, and septum was charged with 10 mL of dry DMF, tris(dibenzylideneacetone)dipalladium (0) (0.572 g, 0.625 moles, 2.0 mole % Pd) and tri(tert-butylphosphine), 10 wt % in hexane (5.058 g, 2.50 mmoles), then stirred for 30 minutes to generate the active catalyst as a black-purple slurry. 2-(4-Bromophenylthio)tetrafluoroethyl bromide (23.0 g, 62.5 mmoles) was dissolved in 25 mL DMF and added to the flask, which was transferred to the hood under nitrogen. A 0.974 M solution of trifluorovinylzinc reagent in DMF (86 mL, 83.1 mmoles) was added over 15 minutes to give an exotherm to 53° C. The flask was heated at 50° C. overnight. The reaction mixture was extracted twice with hexane (100 mL). The hexane extracts were washed twice with water, dried over magnesium sulfate, filtered, and evaporated to give 15.91 g of a light brown oil. The reaction mixture was then diluted 5% hydrochloric acid (150 mL) and extracted twice with toluene (100 mL). The toluene extracts were washed with twice with water, dried over magnesium sulfate, filtered, and evaporated to give 4.04 g of a dark brown oil. The reaction mixture and water washes were combined then extracted twice with hexane (100 mL). The hexane extracts were washed twice with water, dried over magnesium sulfate, filtered, and evaporated to give 2.34 g of a dark brown oil.

The dark brown oils were combined and vacuum distilled to give 3.93 g of a light yellow oil (40-46° C./0.15 Torr). This was combined with the crude light brown oil and vacuum distilled taking the center cut at 39-42° C./75 mTorr to give 8.49 g of 2-[(4-trifluorovinyl)phenylthio]tetrafluoroethyl bromide as a light yellow oil.

$^1$H NMR (CDCl$_3$): 7.51 (d, J=8.4 Hz, 2H), 7.70 (d, J=8.4 Hz, 2H). $^{19}$F NMR (CDCl$_3$): −62.80 (t, J=8.1 Hz, 2F), −85.41 (t, J=8.1 Hz, 2F), −97.18 (dd, J=63.8 and 33.5 Hz, 1F), −111.87 (dd, J=109.1 and 63.8 Hz, 1F), −178.11 (dd, J=109.1 and 33.5 Hz, 1F).

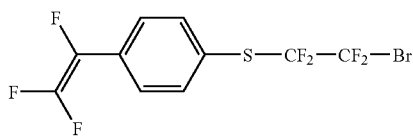

Example 2

A 250 mL three-neck round-bottom flask equipped with a stirring bar and a septum was charged with deionized water (15 mL) and 1.2 mL of a 20 weight % aqueous solution of ammonium perfluorooctanoate. The solution was stirred and sparged with nitrogen for 10 minutes then a blend of 2-[(4-trifluorovinyl)phenylthio]tetrafluoroethanesulfonyl fluoride (2.00 g, 5.37 mmoles) and 2-[(4-trifluorovinyl)phenylthio]tetrafluoroethyl bromide (19.8 mg, 0.0537 mmoles, 1.0 mole % comonomer) was injected by syringe. The mixture was sparged for 5 minutes then ultra-sonicated for 5 minutes to give a stable emulsion. The flask was sealed with a three-way stopcock and evacuated until foaming commenced then vented to nitrogen. This was repeated about 20 times to deoxygenate the solution then the flask was left under vacuum and transferred to the glove box. The solution was transferred to a 100 mL Morton flask equipped with a stirring bar, reflux condenser, and septum then returned to the fume hood and placed under nitrogen. The emulsion was heated to 50° C. and potassium persulfate (KPS) in deionized water (0.5 mL) was added in portions by syringe after nitrogen sparging the solutions then stirring for the specified time: 6 mg (0.022 mmoles), 22 hours; 6 mg, 24 hours; 12 mg (0.044 mmoles), 25 hours; 6 mg, 15 hours. The emulsion was frozen for 4 hours then thawed and treated with concentrated nitric acid (20 mL) at 90° C. for 90 minutes with vigorous stirring. The agglomerated polymer was collected by vacuum filtration, washed three times with water (50 mL) at 90° C., and dried in the vacuum oven. The polymer was dissolved in tetrahydrofuran (THF, 15 mL) and added dropwise to methanol (250 mL) with vigorous stirring. The fine white fibrous polymer was collected by vacuum filtration, washed twice with methanol (500 mL), and dried in the vacuum oven at 70° C. under nitrogen purge. The polymer weighed 0.872 g (43% yield). Gel permeation chromatography (GPC) in THF showed a molecular weight distribution with $M_n$ 12,675, $M_w$ 390,862, and $M_z$ 1,439,851. $^{19}$F NMR (THF) showed a 0.99 mole % incorporation of the comonomer based on the integrations: 46.30 (bs, SO$_2$F), −63 to −64 (bm, 0.99 mole % CF$_2$Br), −84 to −86 (bm, SCF$_2$), −105 to −105.6 (bm, CF$_2$SO$_2$), −102 to −110 (bm, backbone CF$_2$), −166 to −178 (bm, backbone CF). X-ray fluorescence spectroscopy (XRF) showed 0.177 weight % bromine versus 0.215 weight % theoretical.

Example 3

The procedure of example 2 was repeated, except using 60 mg of 2-[(4-trifluorovinyl)phenylthio]tetrafluoroethyl bromide (0.163 mmoles, 3 mole % comonomer) and the following additions of KPS: 12 mg, 23 hours; 6 mg, 18 hours. The polymer weighed 1.15 g (56% yield). GPC showed $M_n$ 311,429, $M_w$ 35,213,692, and $M_z$ 340,509,845. $^{19}$F NMR (THF) showed a 2.93 mole % incorporation of the comonomer based on the integrations. XRF showed 0.590 weight % bromine versus 0.644 weight theoretical.

Example 4

The procedure of example 2 was repeated, except using 100 mg of 2-[(4-trifluorovinyl)phenylthio]tetrafluoroethyl bromide (0.268 mmoles, 5 mole % comonomer) and the following additions of KPS: 12 mg, 24 hours; 6 mg, 20 hours. The polymer weighed 0.939 g (45% yield). GPC showed $M_n$ 254,682, $M_w$ 16,656,956, and $M_z$ 327,960,785. $^{19}$F NMR (THF) showed a 4.84 mole % incorporation of the comonomer based on the integrations. XRF showed 0.983 weight % bromine versus 1.07 weight % theoretical.

Example 5

Membranes were fabricated from the polymers of Examples 2, 3, and 4 by the following method: The polymers were dissolved in α,α,α-trifluorotoluene at 3.5% to 5% by weight of polymer. The solutions were cast onto Mylar® film using doctor blades of either 0.25 mm or 0.51 mm gate height. A reinforcement membrane of expanded polytetrafluoroethylene (ePTFE) was laid into the wet film. Two ePTFE membranes were used: ePTFE-A was provided by Yeu Ming Tai Chemical Industrial Co., Ltd. with basis weight of 10.8 g/m$^2$ and thickness of 24 μm; ePTFE-B Tetratex® was provided by Donaldson with basis weight of 16 g/m² and thickness of 36 µm. Immediately a second coating of polymer solution was applied over the top of the ePTFE, again using a doctor blade with the same gate height as used for the first application. The solvent was allowed to dry at ambient temperature and the resulting membranes peeled from the Mylar®. The membranes were sealed inside foil-lined bags under nitrogen and irradiated at ambient temperature using a 4.3 MV electron beam source according to the dosages shown in Table 1. At the time of irradiation, the sulfur attached to the aromatic ring was present as a sulfide, while the one at the terminus of the side chain was present in a sulfonyl fluoride; their oxidation/hydrolysis status is indicated as S/SO$_2$F. After irradiation, the membranes were hydrolyzed in a mixture of 10 wt potassium hydroxide, 10% methanol, 5% dimethyl sulfoxide, and 75% water at 60° C. for 16 h. The membranes were acidified by soaking in excess 14% nitric acid at 22° C. for 1 h, followed by dipping in deionized water for 30 min, repeating the water rinses for a total of three dips. To measure the swelling of a membrane, a strip was cut of length 55 mm, either along the machine-direction (MD) or along the transverse-direction (TD)×10 mm. The strip was boiled in water for 30 min, and the length L$_W$ was measured while maintaining the membrane wet. The strip was dried under vacuum at 100° C. for 45 min, removed to ambient, and the length L$_D$ was measured quickly while the membrane was still dry. The swelling was calculated as (L$_W$−L$_D$)/L$_D$. The conductivity was measured at 80° C. by the method outlined above, under conditions of controlled relative humidity, and with the current passing through-plane, i.e. perpendicular to the plane of the membrane. Results are indicated in Table 1.

TABLE 1

| | Bromo Comonomer Content mole % | Polymer Form | ePTFE | E-Beam Irradiation kGy | MD Swell % | TD Swell % | Relative Humidity % | Through-Plane Conductivity mS/cm |
|---|---|---|---|---|---|---|---|---|
| 5A | 0 | S/SO$_2$F | A | 20 | 54 | 110 | — | — |
| 5B | 0 | S/SO$_2$F | A | 40 | 72 | 106 | — | — |
| 5C | 0.99 | S/SO$_2$F | B | 20 | 125 | 128 | — | — |
| 5D | 0.99 | S/SO$_2$F | B | 40 | — | 68 | — | — |
| 5E | 2.93 | S/SO$_2$F | B | 20 | 76 | 78 | 25, 50, 95 | 13, 42, 106 |
| 5F | 2.93 | S/SO$_2$F | B | 40 | — | 84 | — | — |
| 5G | 4.84 | S/SO$_2$F | B | 20 | 58 | 57 | — | — |
| 5H | 4.84 | S/SO$_2$F | B | 40 | — | 57 | 25, 50, 95 | 24, 61, 126 |

The swelling was observed to be reduced by the incorporation of the brominated co-monomer.

Some of the membrane samples, prior to e-beam irradiation, were hydrolyzed and acidified using the above procedures. These membranes were sealed inside bags under nitrogen and irradiated by electron beam according to the dosages shown in Table 2. Their oxidation/hydrolysis status is indicated as S/SO$_3$H. For two other membrane samples, after hydrolysis and acidification, the sulfide moiety was oxidized to a sulfone moiety by immersion in a mixture of 10 wt % trifluoroacetic acid, 27% hydrogen peroxide, and 63% water at 50° C. for 23 h. $^{19}$F NMR analysis of polymer dissolved into DMF-d$_7$ indicated that the residual sulfide level was 0.1% and that the residual sulfoxide (intermediate to sulfone) level was ~2%, indicating a high conversion to the sulfone form. After rinsing with water and drying, these membranes were also sealed under nitrogen in barrier bags and irradiated. Their oxidation/hydrolysis status at the time of irradiation is indicated as SO$_2$/SO$_3$H. After irradiation, all the membranes of Table 2 were re-acidified with nitric acid and rinsed with water, tested for swelling, and in one case, conductivity.

TABLE 2

| | Bromo Comonomer Content mole % | Polymer Form | ePTFE | E-Beam Irradiation kGy | TD Swell % | Relative Humidity % | Through-Plane Conductivity mS/cm |
|---|---|---|---|---|---|---|---|
| 5I | 0 | SO$_2$/SO$_3$H | A | 20 | dissolved | — | — |
| 5J | 0 | SO$_2$/SO$_3$H | A | 40 | dissolved | — | — |
| 5K | 2.93 | S/SO$_3$H | B | 0 | dissolved | — | — |
| 5L | 2.93 | S/SO$_3$H | B | 20 | 68 | 25, 50, 95 | 19, 55, 137 |
| 5M | 2.93 | S/SO$_3$H | B | 40 | 47 | — | — |

The sample 5m, without e-beam irradiation, dissolved, while the samples 5n and 5o, with both e-beam irradiation and the bromo-comonomer, did not.

Example 6

A 500 mL round-bottom flask equipped with a stirring bar was charged with deionized water (75 mL) and 6 mL of a 20 weight % aqueous solution of ammonium perfluorooctanoate. The solution was stirred and sparged with nitrogen for 20 minutes then a blend of 2-[(4-trifluorovinyl)phenylthio]tetrafluoroethanesulfonyl fluoride (10.0 g, 26.86 mmoles) and 2-[(4-trifluorovinyl)phenylthio]tetrafluoroethyl bromide (0.308 g, 0.834 mmoles, 3 mole % comonomer) was injected by syringe. The mixture was sparged for 10 minutes then ultra-sonicated for 5 minutes to give a stable emulsion. The flask was sealed with a three-way stopcock and evacuated until foaming commenced then vented to nitrogen. This was repeated about 30 times to deoxygenate the solution, which was then transferred by cannula to a nitrogen-flushed 500 mL Morton flask equipped with a septum, reflux condenser, and a mechanical stirrer consisting of a precision PTFE stirrer bearing and a polished glass shaft with PTFE blade. The emulsion was heated to 50° C. and stirred at high speed. A solution of KPS (150 mg) in deionized water (4 mL) was sparged with nitrogen and added by syringe. After 24 hours, the translucent emulsion was frozen overnight then thawed and treated with concentrated nitric acid (20 mL) at 90° C. for 90 minutes with vigorous stirring. The agglomerated polymer was collected by vacuum filtration, washed five times with water (100 mL) at 90° C., and dried in the vacuum oven. The polymer was dissolved in THF (150 mL) and added dropwise to methanol (800 mL) with vigorous stirring. The fine white fibrous polymer was collected by vacuum filtration, washed twice with methanol (500 mL), and dried in the vacuum oven at 60° C. under nitrogen purge. The polymer weighed 8.80 g (85% yield). A small sample of the polymer was dissolved in trifluorotoluene and cast into a film for GPC analysis in THF: $M_n$ 88,824, $M_w$ 3,501,688, and $M_z$ 9,766,157. $^{19}$F NMR (THF) showed a 3.0 mole % incorporation of the bromine comonomer based on the integrations: 46.0 (bs, $SO_2F$), −63.1 (bm, 3.0 mole % $CF_2Br$), −84 to −88 (bm, $SCF_2$), −105.5 to −106.5 (bm, $CF_2SO_2$), −103 to −112 (bm, backbone CF2), −168 to −179 (bm, backbone CF).

Example 7

A 500 mL round-bottom flask equipped with a stirring bar and reflux condenser was charged with the copolymer of Example 6 (6.90 g) followed by a solution of 10% KOH in 5% methanol/10% DMSO/75% water (175 mL). After stirring 30 minutes, the polymer was wetted by the solution, and was then heated to 64° C. overnight to give a faint yellow dispersion of fine particles. The dispersion was poured into concentrated hydrochloric acid (150 mL) and centrifuged to consolidate the solids. The solids were washed with concentrated hydrochloric acid (125 mL) followed by deionized water (5×100 mL) using the centrifuge. The swollen polymer was transferred to a round-bottom flask with methanol (150 mL), which was evaporated using a rotary evaporator. The polymer was retreated with methanol (150 mL) then re-evaporated to give a rubbery mass, which was dried under vacuum at 70-82° C., weighing 5.873 g (89.5%). $^{19}$F NMR (DMF-$d_7$): −63.1 (bm, ~2 mole % $CF_2Br$), −76 to −90 (bm, $SCF_2$), −110 to −115 (bm, $CF_2SO_3H$), −100 to −120 (bm, backbone $CF_2$), −164 to −180 (bm, backbone CF).

The polymer was dissolved in a total of 345 mL of acetonitrile and added slowly to a solution containing a total of 19.15 g (84 mmol) periodic acid and 192 mg chromium (VI) oxide (1.93 mmol) in 215 mL of acetonitrile. During the addition, a copious amount of white solids precipitated from the solution. A sample of the reaction mixture (3 mL) was centrifuged to remove the solids and submitted for $^{19}$F NMR (DMF-$d_7$), which showed complete oxidation of the sulfide group to the sulfone.

A portion of the reaction mixture was worked up by removing the solids using a centrifuge and washing with acetonitrile (2×50 mL). The combined acetonitrile solution were evaporated then washed with concentrated nitric acid (50 mL) followed by water. The isolated polymer weighed 2.037 g after drying at 65° C. in the vacuum oven under nitrogen purge. The nitric acid and water washes were evaporated to give about 0.25 g, which was combined with the second portion of reaction mixture below.

The second portion of reaction mixture was treated with a saturated aqueous solution of calcium chloride. The liquid was decanted off and the solids washed with concentrated nitric acid followed by water. The isolated polymer weighed 1.445 g after drying at 65° C. in the vacuum oven under nitrogen purge.

The combined polymers were dissolved in a mixture of acetonitrile and DMSO. The solution was added dropwise to a solution of 2M hydrochloric acid in ether to precipitate the polymer, which was collected and washed with ether. The solids were dissolved in acetonitrile, evaporated on a rotary evaporator, and dried in the vacuum oven at 60° C. to give 3.85 g of polymer. $^{19}$F NMR (DMF-$d_7$): −62.6 (bm, 2.6 mole % $CF_2Br$), −108 to −111 (bm, $SO_2CF_2$), −110 to −115 (bm, $CF_2SO_3H$), −100 to −115 (bm, backbone $CF_2$), −164 to −177 (bm, backbone CF).

Example 8

An anionic fluorinated surfactant Zonyl® 1033 D (E.I. DuPont de Nemours, Inc., Wilmington, Del.), sold as a 30 wt % solution, was diluted to a 10 wt % solids solution using ethanol. The solution was stirred over acid-form Dowex® ion-exchange resin beads to remove trace metal cation contaminants. The solution was neutralized up to pH ~4 by addition of tri-n-butylamine to give primarily the tri-n-butylammonium salt form of the surfactant. The solution was further diluted to 0.5% solids with ethanol. Expanded polytetrafluoroethylene (ePTFE-B, Tetratex®, 36 μm thick) microporous membrane was sprayed with a light coating of the surfactant solution and the ethanol evaporated, rendering the ePTFE more easily wetted by polar solvents.

The sulfone-form/acid-form polymer from Example 7 (1 g) was dissolved in 5.6 g of N,N-dimethylformamide to make a 15 wt % polymer solution. An alternative, used to improve the wetting of the ePTFE by the solution, was to make the polymer solution from 1.5 g polymer, 2.3 g of N,N-dimethylformamide, and 1.5 g of n-propanol. The polymer solutions were filtered through 0.45 um glass microfiber filters, and cast onto Mylar® films using a doctor blade of 0.51 mm gate height. The ePTFE was held wrinkle-free by mounting in an embroidery hoop, and the ePTFE was laid into the wet film. The embroidery hoop was detached. The Mylar® substrates and wet films were placed on an aluminum plate heated to 50° C., held within a nitrogen-purged box, and solvent allowed to evaporate for 30 min. A second coating of polymer solution was applied over the top of the ePTFE, again using a doctor blade with 0.51 mm gate height. The resulting membranes were removed from the Mylar® substrates.

The membranes were sealed in bags, irradiated, acidified, and their swelling measured as described in Example 5. Their oxidation/hydrolysis status at the time of irradiation was $SO_2$/$SO_3H$.

TABLE 3

| | Bromo Comonomer Content mole % | Polymer Form | ePTFE | E-Beam Irradiation kGy | TD Swell % |
|---|---|---|---|---|---|
| 8A | 2.6 | $SO_2$/$SO_3H$ | B | 0 | dissolved |
| 8B | 2.6 | $SO_2$/$SO_3H$ | B | 20 | dissolved |
| 8C | 2.6 | $SO_2$/$SO_3H$ | B | 40 | dissolved |
| 8D | 2.6 | $SO_2$/$SO_3H$ | B | 80 | dissolved |

In this example the incorporation of the bromine-containing comonomer and e-beam irradiation was not effective in controlling swelling. It is believed that the sulfone moiety may make the aromatic rings too electron deficient for efficient crosslinking. In such cases it is expected to be advantageous to include a less electron-deficient termonomer, e.g. trifluorostyrene, in the polymer composition.

What is claimed is:

1. A process to prepare a crosslinked membrane, comprising the steps:
   a. providing a copolymer comprising repeat units of Formulae (V) and (VI)

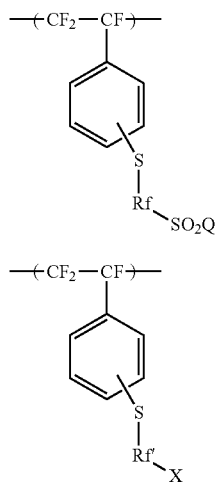

wherein Rf and Rf' are independently a linear or branched perfluoroalkylene group, optionally containing oxygen or chlorine; X is Br or Cl; and Q is F, Br, or Cl;
   b. forming a membrane from the copolymer;
   c. hydrolyzing the —SO$_2$Q moiety to form a —SO$_3$H moiety or salt thereof; and
   d. exposing the copolymer to radiation to form a crosslinked polymer, either before or after formation into a membrane;
   wherein the monomer of Formula VI can enable copolymerization, crosslinking and oxidation to a stable polymer electrolyte membrane that is conductive at low relative humidity, having through-plane conductivity, at 25% relative humidity and 80° C., of at least 13 mS/cm, and transverse direction swelling of not more than 78%.

2. The process of claim 1 wherein Rf and Rf' are independently selected from the group consisting of (CF$_2$)$_r$ wherein r=1 to 20, (CF$_2$CF$_2$)$_r$OCF$_2$CF$_2$ wherein r=1 to 6, and (CF$_2$CF(CF$_3$)O)$_r$CF$_2$CF$_2$ wherein r=1 to 8.

3. The process of claim 1 wherein the copolymer additionally comprises repeat units of Formula (VII)

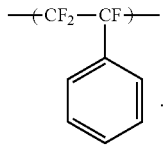

4. The process of claim 1 wherein Formula (V) is Formula (Va) and Formula (VI) is Formula (VIa)

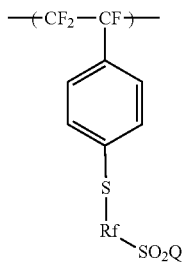

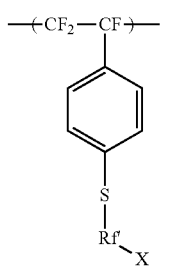

wherein Q is F and X is Br.

5. The process of claim 1, further comprising converting the —S moieties of both Formulae (V) and (VI) into —SO$_2$— moieties to form an oxidized copolymer by contacting said —S— moieties with an oxidizing agent, either before or after formation into a membrane.

6. The process of claim 4, wherein the membrane has through-plane conductivity, at 25% relative humidity and 80° C., of at least 24 mS/cm, and transverse direction swelling of not more than 57%.

* * * * *